(12) United States Patent
Chandwani et al.

(10) Patent No.: US 12,554,667 B2
(45) Date of Patent: Feb. 17, 2026

(54) ON-PACKAGE ACCELERATOR COMPLEX (AC) FOR INTEGRATING ACCELERATOR AND IOS FOR SCALABLE RAN AND EDGE CLOUD SOLUTION

(71) Applicant: Intel Corporation, Santa Clara, CA (US)

(72) Inventors: Neelam Chandwani, Portland, OR (US); Shridhar Bendi, Bangalore (IN); Rajesh Vivekanandham, Bangalore (IN); Rahul Pal, Bangalore (IN); Eric J. Dahlen, Portland, OR (US); Antonio J. Hasbun Marin, San Antonio de Belen (CR); Chung-Chi Wang, Sunnyvale, CA (US); Qian Li, Beaverton, OR (US); Hosein Nikopour, San Jose, CA (US); Sravanthi Kota Venkata, San Jose, CA (US); Rajesh Poornachandran, Portland, OR (US); Udayan Mukherjee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 17/711,986

(22) Filed: Apr. 1, 2022

(65) Prior Publication Data
US 2022/0222194 A1 Jul. 14, 2022

(51) Int. Cl.
*G06F 13/40* (2006.01)
*G06F 13/16* (2006.01)

(52) U.S. Cl.
CPC ...... *G06F 13/4068* (2013.01); *G06F 13/1668* (2013.01)

(58) Field of Classification Search
CPC .................. G06F 13/1668; G06F 13/4068
See application file for complete search history.

(56) References Cited

U.S. PATENT DOCUMENTS

| | | | |
|---|---|---|---|
| 2014/0229709 A1* | 8/2014 | Kuesel | G06F 9/3009 712/36 |
| 2019/0102311 A1* | 4/2019 | Gupta | G06F 12/0831 |
| 2019/0363717 A1* | 11/2019 | Swarbrick | G06F 21/85 |
| 2020/0294180 A1* | 9/2020 | Koker | G06T 1/20 |
| 2022/0283841 A1* | 9/2022 | Jayavelu | H04W 40/246 |

* cited by examiner

*Primary Examiner* — Henry Tsai
*Assistant Examiner* — Harry Z Wang
(74) *Attorney, Agent, or Firm* — Nicholson De Vos Webster & Elliott LLP

(57) ABSTRACT

Methods and apparatus for on-package accelerator complex (AC) for integrating accelerator and IOs for scalable RAN and edge cloud solutions. The AC comprises one or more dies including an IO interface tile that is coupled to multiple intellectual property (IP) blocks that may be integrated on the same die as the IO interface tile or separate dies that are coupled to the IO interface tile via die-to-die or chiplet-to-chiplet interconnects. The IP blocks may include a network interface (e.g., Ethernet) and one or more accelerators. The package further includes a central processing unit (CPU) that is coupled to the AC via a die-to-die or chiplet-to-chiplet interconnect. The IO interface tile includes integrated shared scratchpad memory that is shared among the IP blocks and the CPU cores. The IO interface tile further includes an interface controller for scheduling IP blocks and configuring data transfers between the IP blocks, such as used by a RAN pipeline.

20 Claims, 15 Drawing Sheets

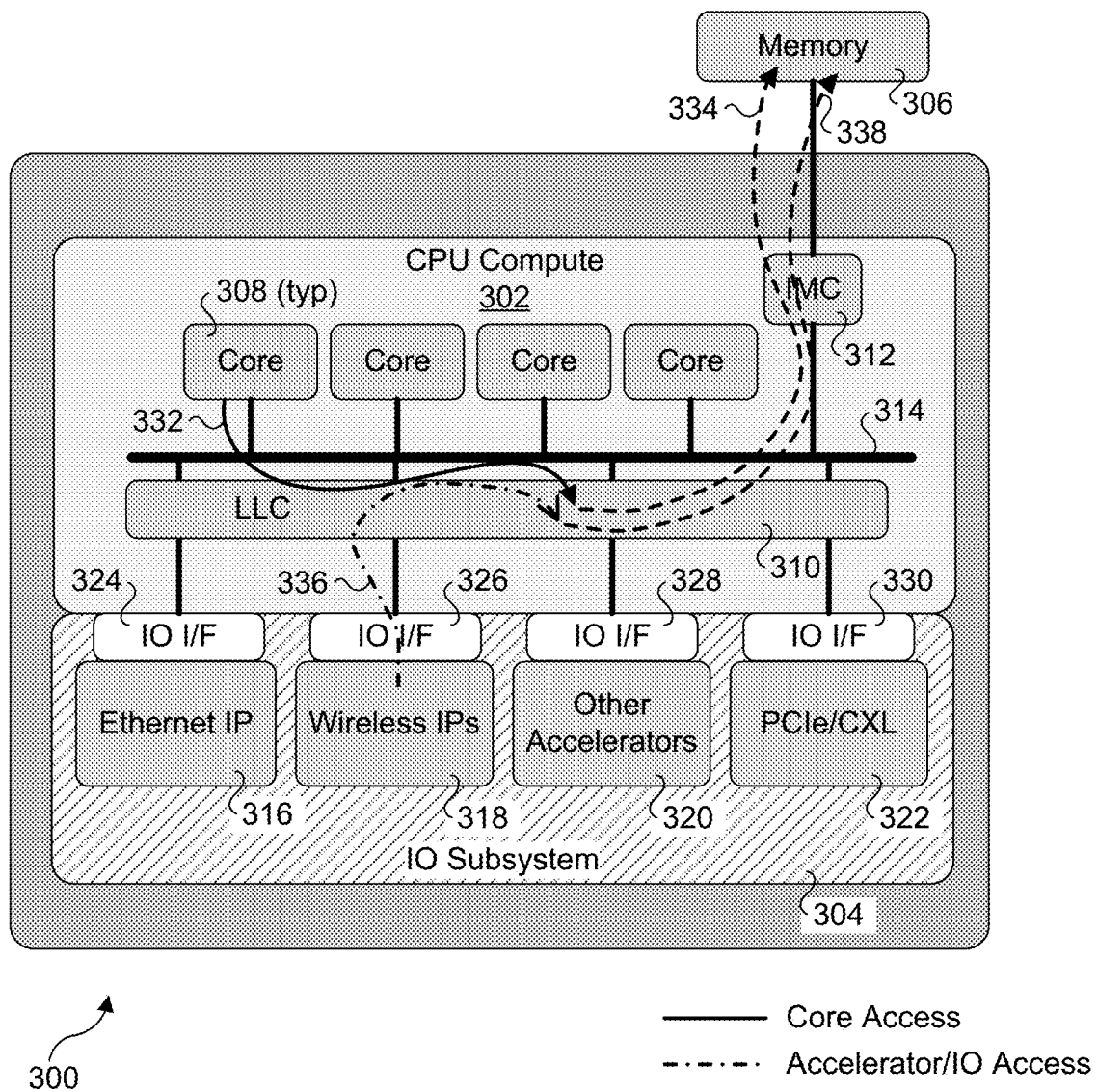
*Fig. 3* *(Prior Art)*

Fig. 7 *(Prior Art)*

ON-PACKAGE ACCELERATOR COMPLEX (AC) FOR INTEGRATING ACCELERATOR AND IOS FOR SCALABLE RAN AND EDGE CLOUD SOLUTION

BACKGROUND INFORMATION

Emerging trends beyond 5G (Fifth Generation) present extreme scale challenges for CPU (Central Processing Unit) servers and platforms utilized in Radio Access Networks (RANs) and edge cloud deployments. These trends include 90% global connectivity covering both terrestrial and non-terrestrial networks, private wireless networks at scale and high-performance use cases demanding high uplink data throughput and/or ultra-low latency. These trends are projected to require 10-50× scaling of the key performance indicators (KPIs) as defined by combination of peak data throughput, latency, connection density and reliability.

FIG. 1 shows industry projected performance scale up requirements going from 5G to Beyond 5G. Beyond 5G includes both 5G advanced and 6G wireless networks. As shown, performance must be scaled across multiple dimensions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a diagram illustrating an access pattern implemented by a CPU when accessing IPs in an IO subsystem under a conventional architecture;

DETAILED DESCRIPTION

Figure 1:
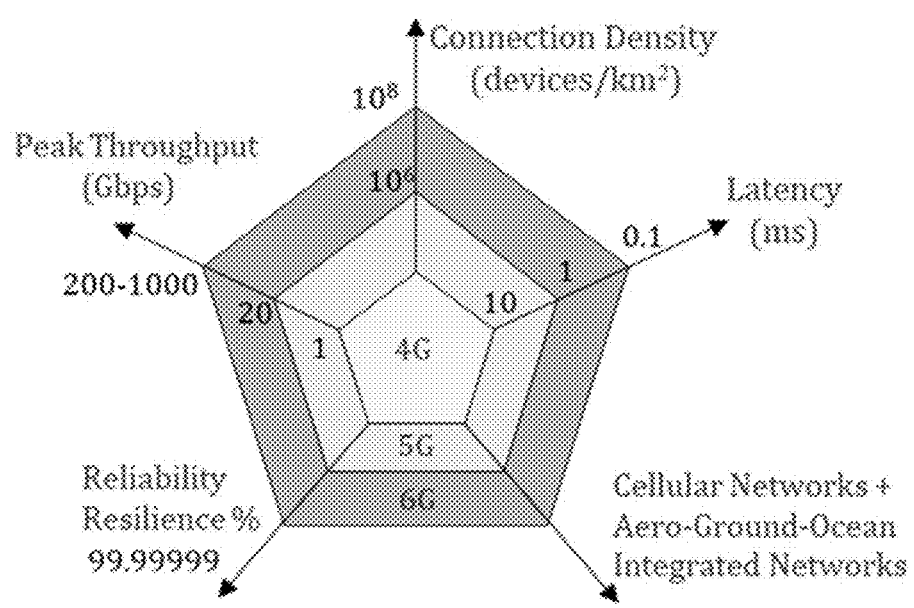
FIG. 1 is a diagram showing industry projected performance scale up requirements going from 5G to Beyond 5G.

Embodiments of methods and apparatus for on-package accelerator complex (AC) for integrating accelerator and IOs for scalable RAN and edge cloud solutions are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, a novel on-package Accelerator Complex (AC) is provided as a breakaway strategy as opposed to integration of the wireless hardware acceleration IPs (Intellectual Property blocks) onto a standard CPU IO (input-output) tile. The AC employs a combination of a new IP interface tile die and disaggregated IP tiles, which may be integrated on the IP interface tile or may comprise separate dies. In one embodiment, the interface tile connects to the System on Chip (SoC) compute CPU tile using the same Die-to-Die (D2D) interfaces and protocol as an existing CPU IO die. This enables high bandwidth connections into the CPU compute complex.

The AC provides high bandwidth D2D interfaces to connect independent accelerator and IO tiles, e.g., Ethernet IO, wireless accelerators, AI or media accelerators, etc. Such disaggregation enables these tiles to be developed in a relatively unconstrained manner, allowing them to scale in area to meet the increasing performance needs of the B5G roadmap. Additionally, these IPs may connect using protocols such as CXL (Compute Express Link), Universal Chiplet Interconnect Express (UCIe), or Advanced eXtensible Interface (AXI) that may provide the ability to scale bandwidth for memory access beyond PCIe specified limits for devices. Leveraging industry standard on-package IO for these D2D interfaces, e.g., AIB, allows integration of third-party IPs in these SoCs. On-package integration in this manner of such IPs provides a much lower latency and power efficient data movement as compared to discrete devices connected over short reach PCIe or other SERDES (serializer/deserializer) interfaces. Additionally, the disaggregated IP tiles can be constructed in any process based on cost or any other considerations.

Figure 2:
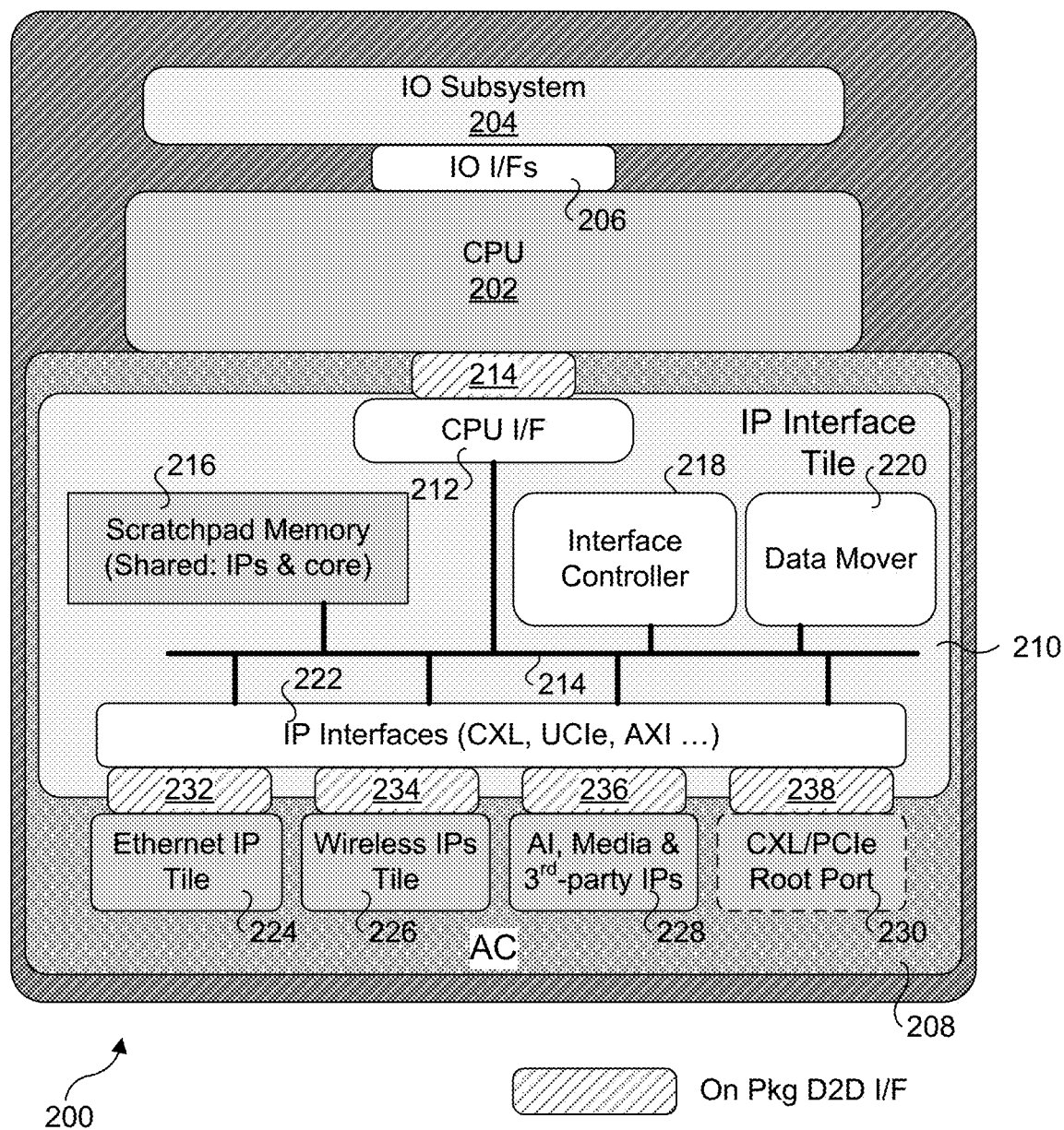
FIG. 2 is a diagram illustrating a multi-die package including an IP interface tile coupled to IP tiles including accelerators, according to one embodiment.

FIG. 2 shows an exemplary AC 208 integrated on a multi-die package 200, which includes a CPU 202 coupled to an IO subsystem 204 via IO interfaces 206. Generally, IO subsystem 204 and IO interfaces 206 are illustrative of conventional IO components and interfaces that are known in the art and outside the scope of this disclosure.

AC 208 includes an IP interface tile 210 having a CPU interface (I/F) 212 coupled to CPU 202 via a D2D interface 214. Multiple components are coupled to CPU interface 212 via an interconnect structure 214 including scratchpad memory 216, an interface controller 218, a data mover 220, and IP interfaces 222. IP interfaces 222 represent IP interfaces that are coupled to respective IP tiles, including an Ethernet IP tile 224, a wireless IPs tile 226, an AI (Artificial Intelligence), media and third-party IPs tile 228, and a CXL/PCIe (Compute Express Link/Peripheral Component Interconnect Express) root port tile 230 via respective interconnects 232, 234, 236, and 238. In some embodiments, interconnects 232, 234, 236, and 238 comprises on-package die-to-die interfaces or chiplet-to-chiplet interconnects such as UCIe.

In some use cases, scratchpad memory 216 is used for transient data such as used in RAN pipeline processing, media processing, and processing of types of data. This memory is accessible by both the IO and accelerators on the AC as well as the SoC CPU(s). Dis-aggregating and dedicating memory for this purpose provides a multitude of benefits that are advantageous for meeting the ongoing demands of the B5G RAN pipe. Scratchpad memory 216 provides a low and deterministic latency when compared to the CPU main memory system, an important variable that needs be to addressed to ensure IPs can meet the B5G real-time latency requirements as well as sustain more than 10× increase in memory bandwidth demand expected in B5G. Also, the available memory bandwidth on an AC can be designed to match the needs of the RAN pipeline using higher bandwidth memories such as SRAM, ADM, etc. Since the IPs connected to AC access this local memory, such accesses no longer use the CPU interconnect and external memory allowing the CPU-to-memory bandwidth to be reserved for CPU compute operations. Another, significant benefit of this scratchpad memory on the AC is that it allows more seamless data movement between IPs that are chained in the RAN pipeline, potentially even allowing data to be consumed inline, e.g., for an Ethernet to wireless accelerator, or a wireless accelerator to an AI accelerator.

In one embodiment, the scratchpad memory is software-managed and not hardware coherent to avoid the costs and overheads of coherency management. Optionally, the AC may implement memory coherency for a portion or all memory usage.

Generally, interface controller 218 comprises a small core, microcontroller, or other processing element that can be used to offload the management of RAN pipeline control tasks such as scheduling hardware accelerators and setting up the data movement actions for chaining of tasks across accelerators. Offloading these operations improves the efficiency of the CPU by unburdening the CPU of such control management actions and allowing focus on their own compute tasks. The use of local management is also more efficient and reduces pipeline jitter.

Data mover 220 comprises an IP block, such as but not limited to a Data Streaming Accelerator (DSA) that provides software a standard interface for efficient data movement between the various accelerators and IO IPs as well as host application domains. This reduces the overheads of relying on cores or data movement engines on other chiplets or dielets to move data between IPs and/or the scratchpad memory 216 on IP interface tile 210.

Figure 2A:
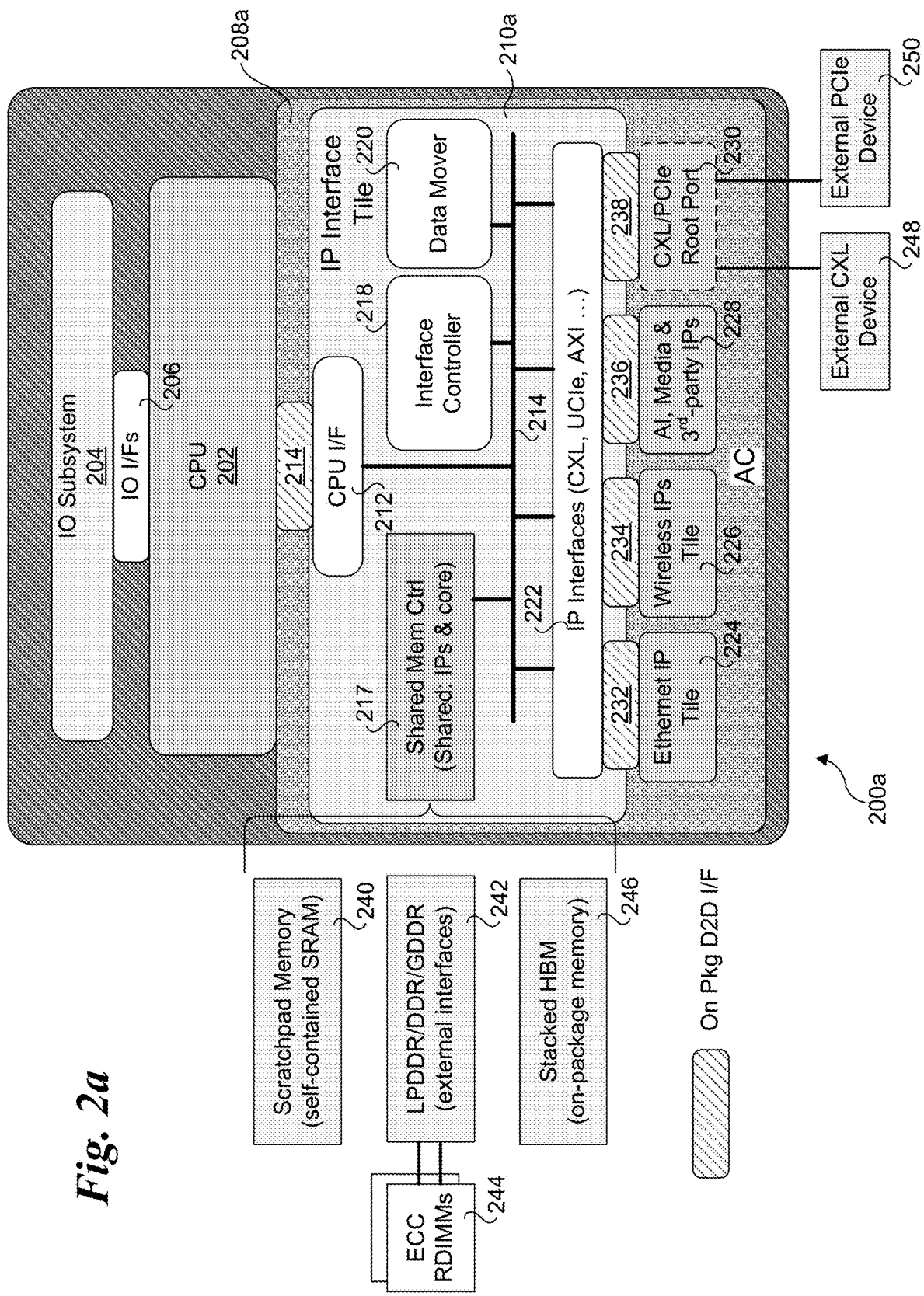
FIG. 2a is a diagram illustrating an alternative configuration of the multi-die package of FIG. 2 under which the IP interface tile includes a shared memory controller coupled to external memory or stack high bandwidth memory, according to one embodiment.

FIG. 2a shows a multi-die package 200a including an IP interface tile 210a on an AC 200a under which shared memory 216 has been replaced with a shared memory controller 217. As shown on the left-hand side of FIG. 2a, shared memory controller 217 may include scratchpad memory 240. It may also include one or more LPDDR/DDR/GDDR memory interfaces 242 to which external memory devices would be coupled, such as depicted by ECC RDIMMs 244. Optionally, shared memory controller 217 may be coupled to stacked High-bandwidth Memory (HBM) comprising on package memory. In one embodiment the SMC subsystem memory appends to the main memory as a distinct NUMA (Non-Uniform Memory Access) domain.

Multi-die package 200a further shows an external CXL device 248 and an External PCIe device 250 connected to CXL/PCIe root port tile 230. In addition to being implemented has a separate die/tile, in some embodiments a CXL and/or a PCI root port may be integrated on IP interface tile 210 (FIG. 2) or 210a. This will enable external accelerators and IO devices to utilize the components of this on-package AC and optimizes the data flow.

Figure 2B:
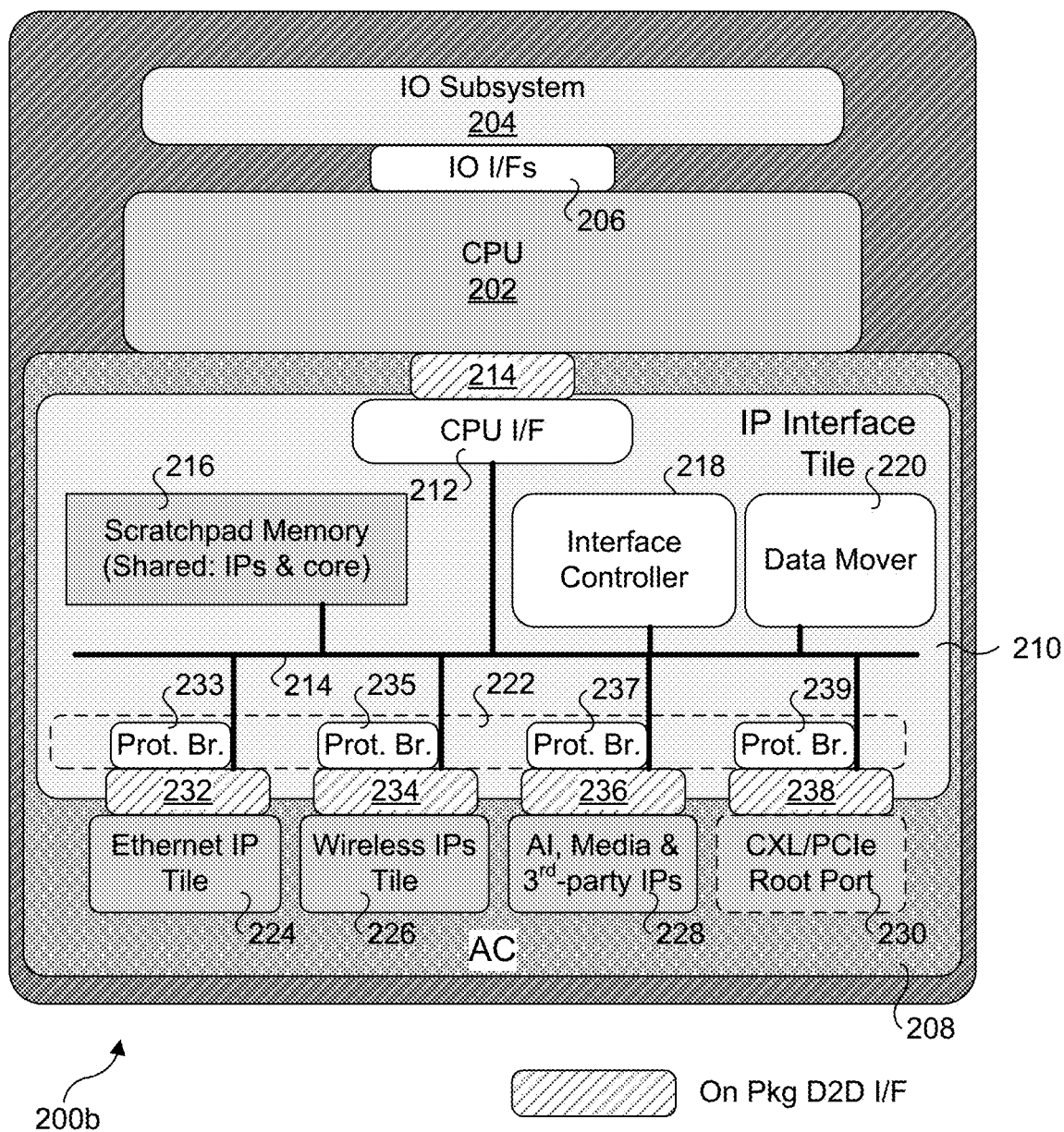
FIG. 2b is a diagram illustrating further details of the IP interfaces in the IP interface tile, according to one embodiment.

FIG. 2b shows a multi-die package 200b illustrating further details of IP interfaces 222. Generally, an IP interface may include a protocol bridge, as depicted by protocol bridges 233, 235, 237, and 239. The protocol bridge performs protocol translations between a protocol used by interconnect structure 214 and the protocol used by a given IP tile, such as PCIe, CXL, UCIe, AXI, etc. Generally, interconnect structure 214 may employ a proprietary protocol or a published protocol such as but not limited to ARM AMBA, AXI (non-coherent version) and ACE (AXI Coherency Extensions) protocols. Further details of the IP interface/protocol bridge/D2D interconnect structure are described and illustrated below in FIG. 9.

Sample Data Access/Movement

FIGS. 3-8 compare and contrast high-level data flows using a conventional processor/SoC architecture with an exemplary AC-based architecture. The diagrams present data access paths from IOs, accelerators and CPUs for, e.g., RAN pipeline communication (the actual data movement direction can be in either direction depending on the particular flow). In the following examples access to single cachelines are described. One of skill in the art will recognized that a single memory or DMA data transaction or the like may be used to access multiple cachelines of data at a time. In addition, block-based memory access schemes may also be supported.

Figure 4:
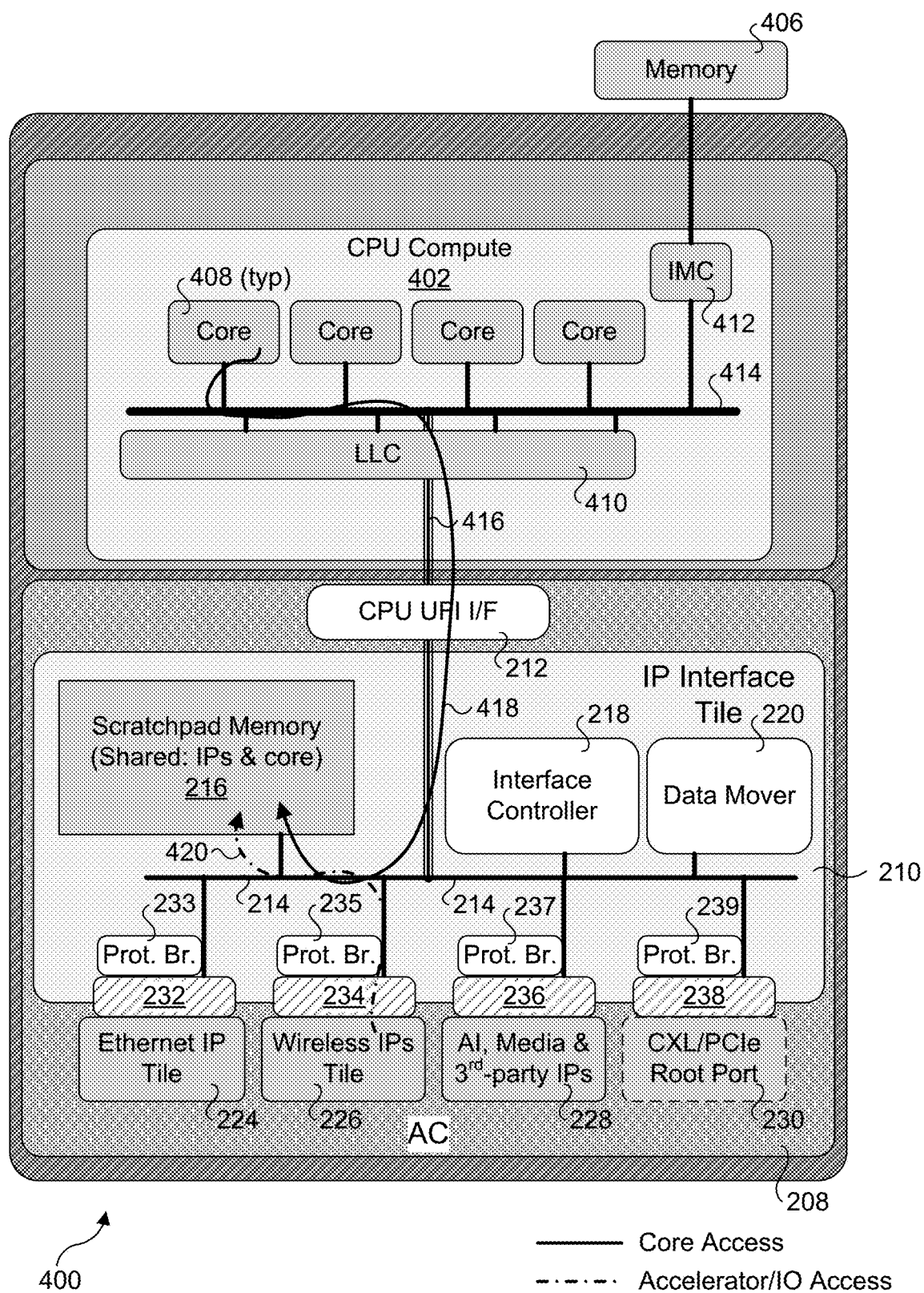
FIG. 4 is a diagram illustrating an IP access pattern implemented by an embodiment of the multi-die package.

FIGS. 3 and 4 respectively illustrate examples of a core access and an accelerator I/O access using a processor/SoC 300 having a conventional processor/SoC architecture and a multi-die package 400 including a AC 402. As shown in FIG. 3, processor/SoC 300 includes a CPU compute block 302 coupled to an IO subsystem 304 and coupled to external memory 306. CPU compute block 302 includes a plurality of cores 308, an LLC 310, and an integrated memory controller (IMC) 312 interconnected via an interconnect structure 314. As is known, cores 308 may include Level 1 (L1) and Level 2 (L2) caches, which are not separately shown for simplicity. The L1 caches, L2 caches, LLC 310 and memory 306 are configured to implement a coherent memory domain. Copies of cachelines in memory 306 are cached in LLC 310 and the L1/L2 caches using one or more known cache coherency protocols. In some embodiments, LLC 310 is an "inclusive" LLC, meaning a copy of cachelines in the L1 and L2 caches are present in LLC 310 at a given point in time. LLC 310 may also be implemented as a non-inclusive LLC.

IO subsystem 304 includes an Ethernet IP block 316, wireless IPs 318, other accelerators 320, and a PCIe/CXL device 322, which are respectively coupled to interconnect structure 314 via IO interfaces 324, 326, 328, and 330. These IO blocks and devices are exemplary and illustrative of various types of IO blocks and IO devices that may be use in an IO subsystem. It will further be recognized that one or more of Ethernet IP block 316, wireless IPs 318, other accelerators 320, and a PCIe/CXL device 322 may include an off-chip device that is external to processor/SoC 300; for simplicity, such off-chip devices are not shown in the IO subsystems illustrated herein.

FIG. 3 shows examples of a core access pattern and an accelerator/IO access pattern. As mentioned above, LLC 310 caches copies of cachelines in memory 306. In this example, the first core 308 is executing an instruction thread that includes an instruction to access a particular cacheline at an associated address. The core will first check its L1 and L2 caches to see if a copy of the cacheline is present. If not, the request will be forwarded to LLC 310 to check to see if a copy of the cacheline is present in the LLC, as depicted by a datapath 332. In the examples herein, the cachelines are not present. In such instances an LLC agent or other logic (not separately shown) will submit a request to IMC 312 to access the cacheline from memory 306, as depicted by a datapath 334. Data in the cacheline would be read and returned along the reverse path of datapaths 334 and 332, eventually being written to the cores L1 cache, at which point the data in the cacheline can be accessed by the core.

In the accelerator/IO access example in FIG. 3, an access for a cacheline originates from an IP block in wireless IPs 318. Conventional IO subsystems include mechanisms to enable IO blocks and components to access memory out-of-band, meaning without requiring the use of CPU cores. For example, IO subsystems employing PCIe infrastructure support DMA (Direct Memory Access) using PCIe DMA transactions. Other DMA mechanisms may also be provided.

As shown via a datapath 336, an access request originating from wireless IPs 318 employs IO interface 326 to access LLC 310 via a portion of interconnect structure 314. As before, the requested cacheline is not present in LLC 310, and thus the request is forwarded to IMC 312 to access memory 306, as depicted by a datapath 338. As before, a copy of the data in the cacheline are returned via the reverse path illustrated for datapaths 338 and 336.

A common access pattern in a producer-consumer model in which a portion of a workload is offloaded from a CPU core to an accelerator or other non-CPU component employs work queues and completion queues and the like that are stored in system memory (e.g., memory device 306). Rather than directly passing data between a CPU core and an accelerator, software executing on the CPU core is used to manage one or more work queues which may contain work descriptors and the like that are accessed by the accelerator to determine what data needs to be processed by the accelerator. After retrieving and processing the data, the accelerator generates a work completion entry or the like (or updates an associated data structure in system memory) and places the processed data back into system memory wherein it can be accessed by the CPU core.

As shown in FIG. 4, multi-die package 400 includes a CPU compute block 402 coupled to AC 208 via a CPU UFI (Ultra Path Interconnect) interface 212 and associated UPI interconnect 416. In a manner similar to CPU compute block 302, CPU compute block 402 include multiple cores 408 coupled to an LLC 410 and an IMC 412 via an interconnect structure 414. IMC 412 is configured to provide Read/Write access to a memory 406.

As shown by the datapaths 418 and 420, rather than access data in memory 406, multi-die package 400 employs scratchpad memory 216 to store work and completion queues and associated shared data that can be accessed by both CPU cores 408 and the various tiles and blocks on AC 208. As shown by datapath 418, the first core 408 accesses scratchpad memory via a path that traverses a portion of interconnect structure 414 to UPI interconnect 416 including CPU UPI interface 212 to a portion of interconnect structure 214 to scratchpad memory 216. Wireless IPs tile 226 also accesses scratchpad memory 216 via die-to-die interconnect 234, an applicable IP interface in IP interfaces 222, and a portion of interconnect structure 214.

Use of scratchpad memory 216 provides the advantages discussed above, including significantly lower and deterministic latency when compared with the conventional architecture such as shown in FIG. 3 under which system (main) memory is accessed. It also doesn't consume any bandwidth associated with access memory 406. Moreover, under the architecture implemented by multi-die package 400, both consumers and producers are provided with a high-bandwidth and deterministic low latency path to shared memory in scratchpad memory 216.

Figure 5:
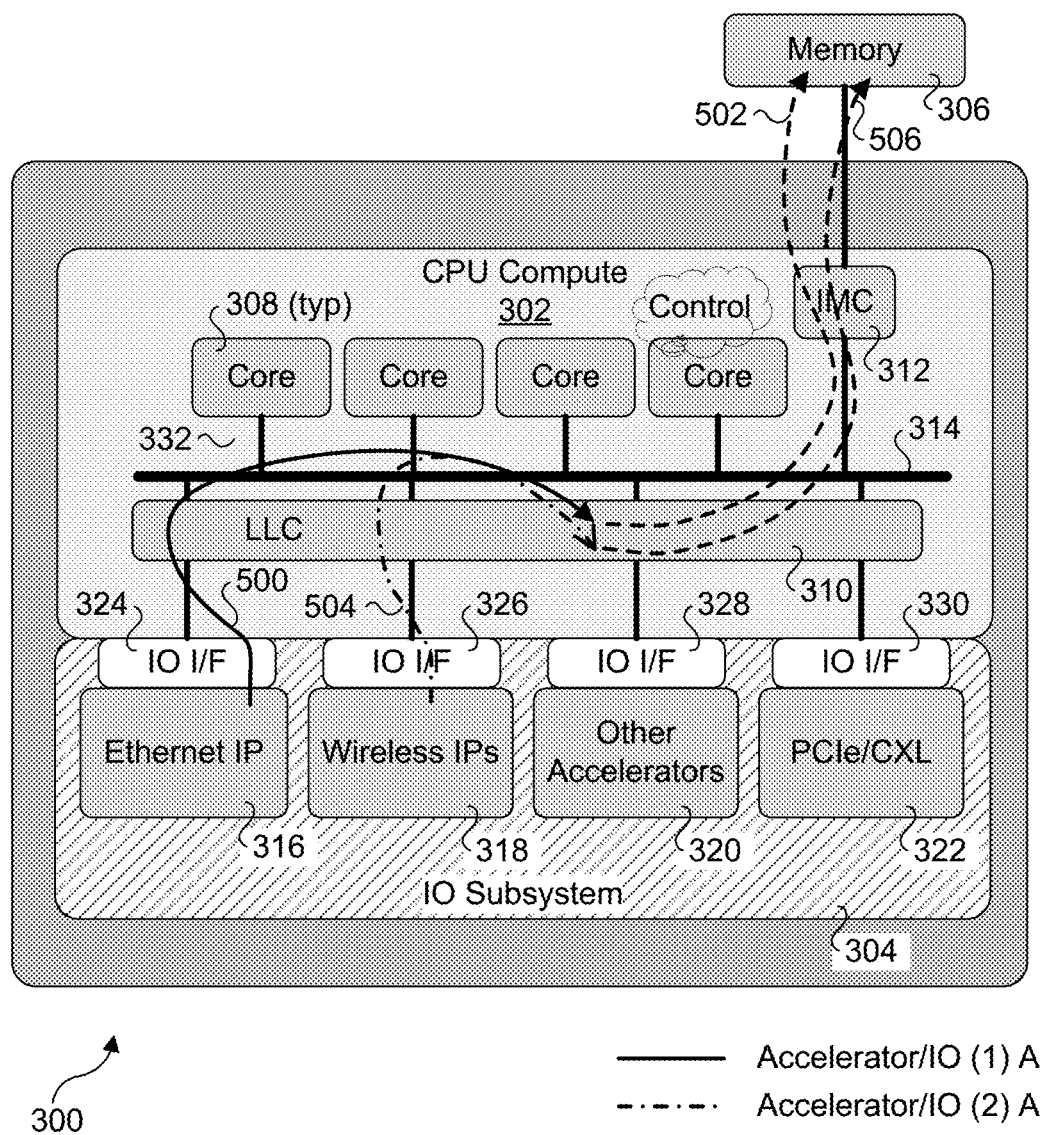
FIG. 5 is a diagram illustrating an access pattern for a non peer-to-peer (P2P) accelerator/IO-to-accelerator/IO data transfers implemented by a CPU coupled to an IO subsystem under a conventional architecture.
Figure 6:
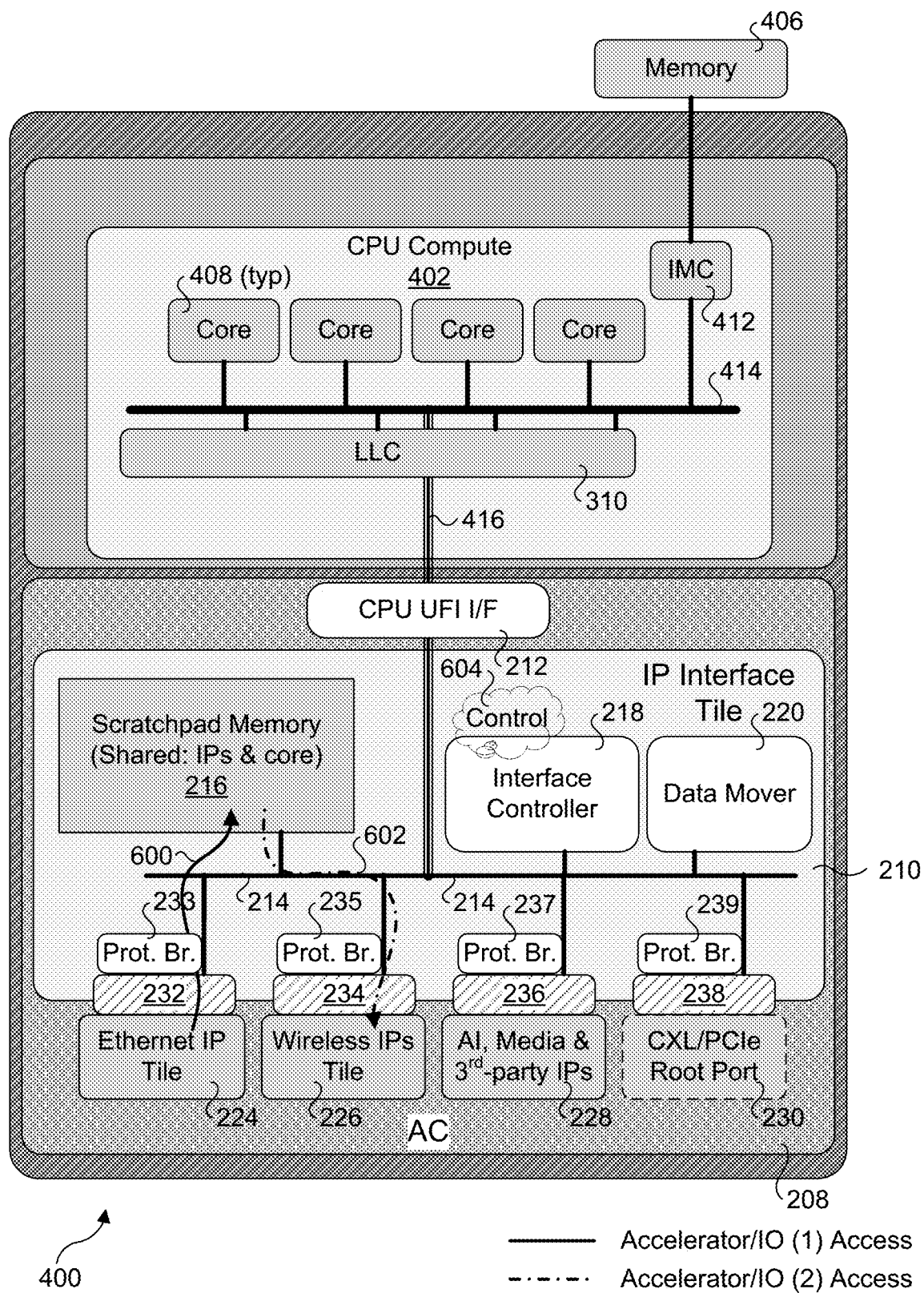
FIG. 6 is a diagram illustrating an access pattern for a non peer-to-peer (P2P) accelerator/IO-to-accelerator/IO data transfers implemented by an embodiment of the multi-die package.

FIGS. 5 and 6 show memory access patterns for non peer-to-peer (P2P) accelerator/IO-to-accelerator/IO data transfers using processor/SoC 300 and multi-die package 400. Under the conventional approach shown in FIG. 5, Ethernet IP 316 employs datapaths 500 and 502 to access memory 306. Datapath 500 traverses IO interface 324 and a portion of interconnect structure 314 to reach LLC 310. Upon detecting a cacheline miss (requested cacheline not present in LLC 310) the LLC agent or other logic forwarded the request to IMC 312 which then accessed the requested cacheline from memory 306.

A similar path is used by wireless IPs 318 to access a cacheline. As shown by a datapath 504, the access request traverses I/O interface 326 and a portion of interconnect structure 314 to reach LLC 310. Upon detecting a cacheline miss, the LLC agent or other logic forwarded the request to IMC 312 which then accessed the requested cacheline from memory 306.

As shown in FIG. 5, under the conventional CPU model, when accelerators do not present memory for direct P2P data movement or the software model does not support such flows, such data movement comprise accesses to system (main) memory from both the produces IO/accelerator and the consumer IO/accelerator. This contrasts with the improved accelerator/IO-to-accelerator/IO data access model provided by multi-die package 400 shown in FIG. 6.

Under the architecture shown in FIG. 6 data are written to a buffer in scratchpad memory 216 via a producer IP, followed by the data being read from the buffer by a consumer IP. As shown by a datapath 600, in connection with a DMA Write transaction Ethernet IP tile 224 (the producer) accesses scratchpad memory 216 via die-to-die interface 232, protocol bridge 233, and a portion of interconnect structure 214. Similarly, as shown by a datapath 602, in connection with a DMA Read transaction wireless IPs tile 226 accesses scratchpad memory 216 via die-to-die interface 234, protocol bridge 235, and a portion of interconnect structure 214. In addition, the coordination and control actions for these data movement is handled by control logic 604 in interface controller 218, in one embodiment.

Figure 7:
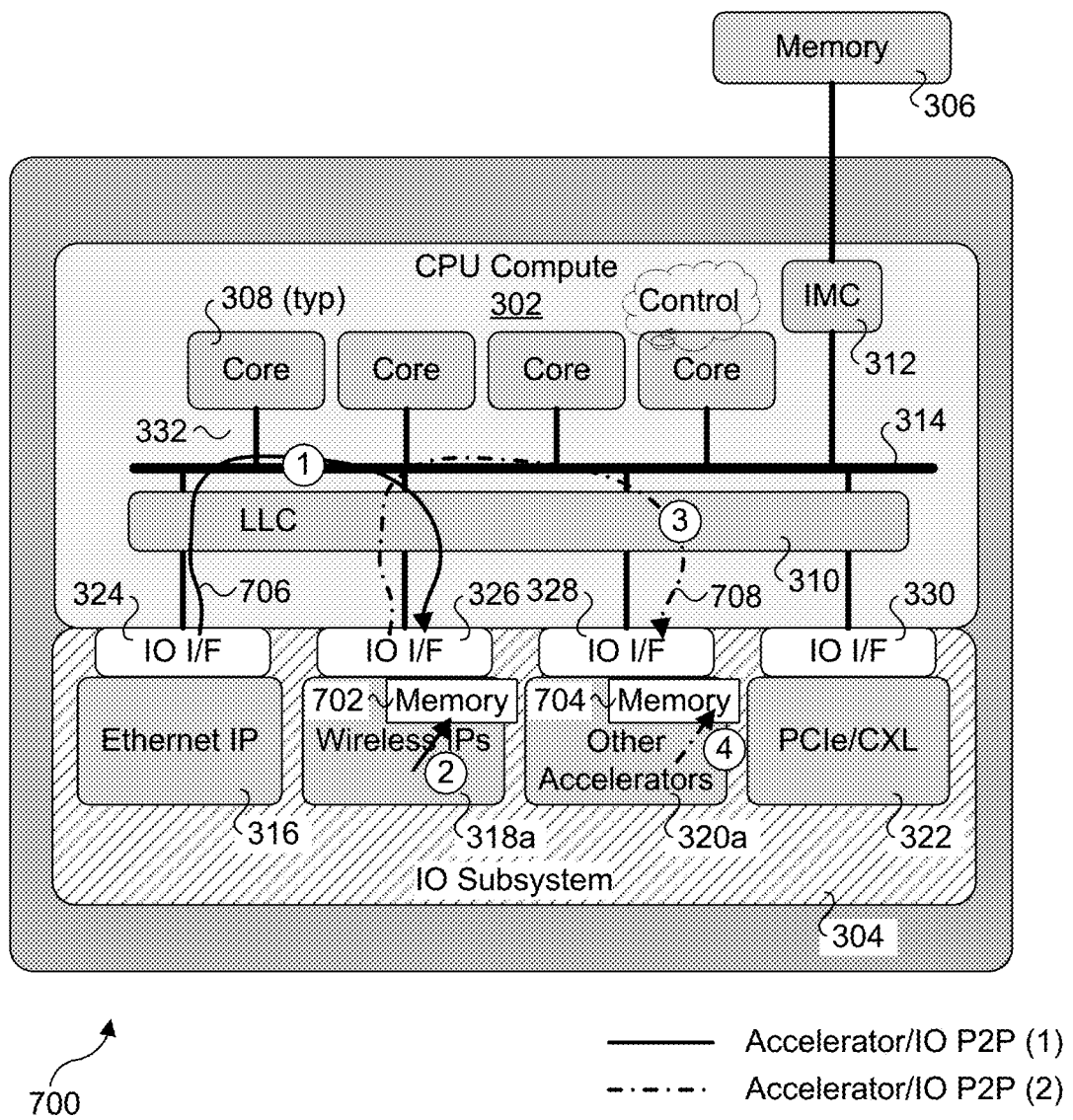
FIG. 7 is a diagram illustrating a pair of accelerator/IO P2P transfers implemented by a CPU coupled to an IO subsystem under a conventional architecture.

FIG. 7 shows a pair of accelerator/IO P2P transfers using a processor/SoC 700. As depicted by like reference numbers for processor/SoC 300 of FIG. 3 and processor/SoC 700, they have substantially similar structures. However, for processor/SoC 700, wireless IPs 318*a* includes memory 702 and other accelerators 320*a* includes memory 704.

Some P2P transfers under a conventional processor/SoC architecture are similar to RDMA (Remote Direct Memory Access) direct and allow data to be directly deposited to a peer device memory. For example, as shown by a datapath 706 and a first operation '1', a first P2P data transfer from Ethernet IP 316 to wireless IPs 318*a* flows from IO interface 324 to interconnect structure 314 to IO interface 326 into memory 702. Once written to memory 702, a wireless IP in wireless IPs 318*a* can access the data, as depicted by a second operation '2'. As shown by a datapath 708 and a third operation '3', a second P2P data transfer from wireless IPs 318*a* to other accelerators 320*a* flows from IO interface 326 to interconnect structure 314 to IO interface 328 into memory 704. Once written to memory 704, an accelerator in other accelerators 320*a* can access the data, as depicted by a fourth operation '4'.

Under an optional approach, data is transferred between IO IPs using a conventional RDMA approach, wherein the consumer IP reads the data from a predetermined buffer in the memory of the producer IP. Under either conventional RDMA or RDMA direct, there are additional operations that are used to initialize buffers and/or queues in the memories of the producer IP and the consumer IP.

Figure 8:
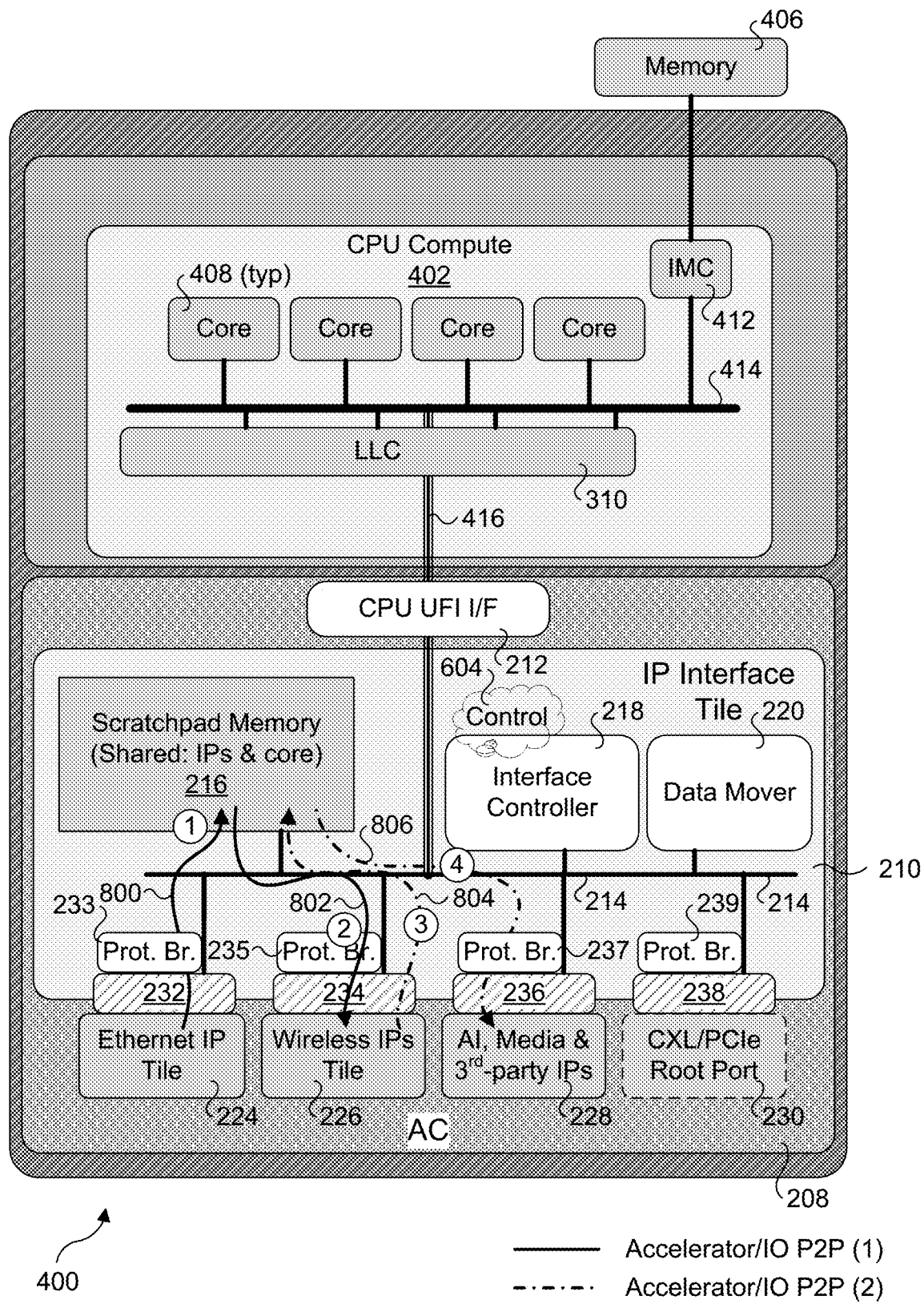
FIG. 8 is a diagram illustrating a pair of accelerator/IO P2P transfers implemented by an embodiment of the multi-die package.

FIG. 8 shows examples of a pair of accelerator/IO P2P transfers using a multi-die package 400 to support a RAN pipe. As before, the memory transfers employ scratchpad memory 216, which allows data to be shared inline between producer and consumer IPs. Prior to the data transfers, control logic 604 in interface controller 218 will configure shared buffers in scratchpad memory 216 and inform the various IPs of the addresses of the shared buffers, thus enabling the IPs to know what memory addresses to use. Additional transfer coordination operations may be provided by interface controller 218 and/or data mover 220.

As illustrated by a datapath 800 and a first operation '1', Ethernet IP tile 224 writes data to a shared buffer in scratch memory 216 using an applicable DMA Write transaction. The data traverse die-to-die interface 232, protocol bridge 233, and a portion of interconnect structure 214. As illustrated by a datapath 802 and a second operation '2', an IP in wireless IPs tile 226 retrieves the data using an applicable DMA Read transaction. The data traverse a portion of interconnect structure 214, protocol bridge 235, and then die-to-die interface 234 prior to being written to a buffer on wireless IPs tile 226 via which the consumer wireless IP can access the data.

The second accelerator/IO P2P transfer employs a similar access pattern. As illustrated by a datapath 804 and a third operation '3', wireless IPs tile 226 writes data to a shared buffer in scratch memory 216 using an applicable DMA Write transaction. The data traverse die-to-die interface 234, an applicable IP interface among IP interfaces 222, and a portion of interconnect structure 214. As illustrated by a datapath 806 and a fourth operation '4', an IP in AI, media & 3$^{rd}$ party IPs 228 retrieves the data using an applicable DMA Read transaction. The data traverse a portion of interconnect structure 214, an applicable IP interface among IP interfaces 222, and then die-to-die interface 236 prior to being written to a buffer on IP in AI, media & 3$^{rd}$ party IPs 228 via which the consumer wireless IP can access the data.

Figure 9:
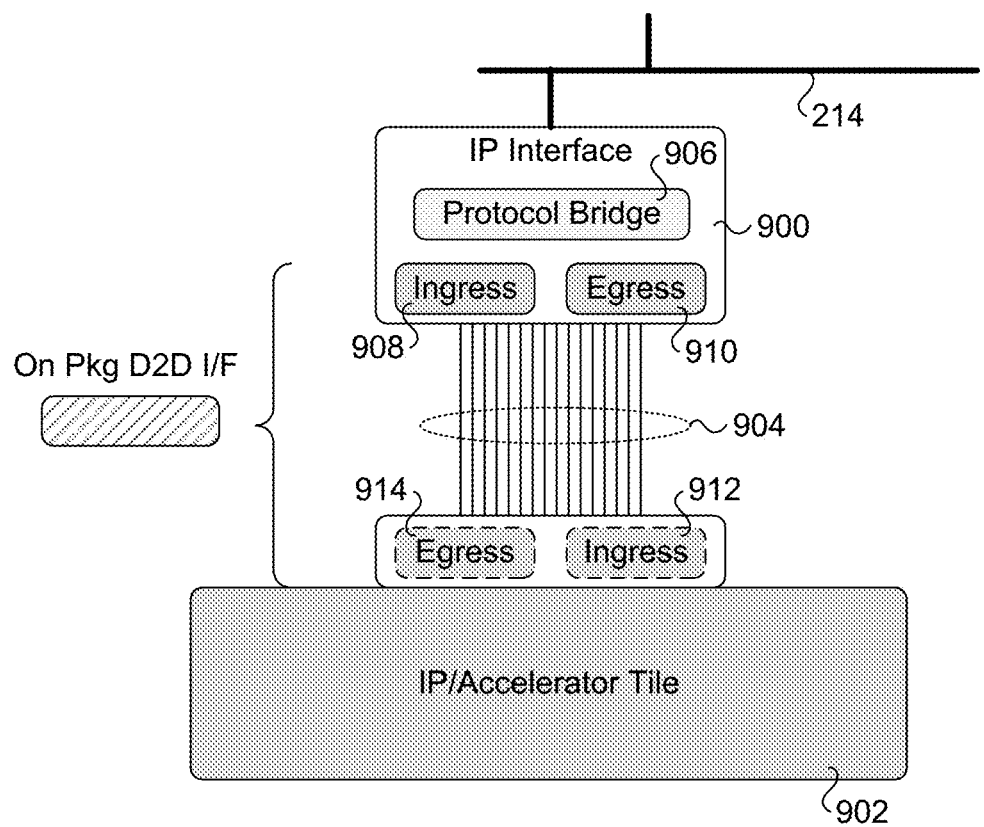
FIG. 9 is a diagram illustrating further details of a die-to-die interconnect and interface, according to one embodiment.

FIG. 9 shows further details of the IP interface/protocol bridge/D2D interconnect structure. The components/structures include an IP interface 900 connected to an IP/Accelerator tile 902 via a D2D interconnect structure 904. IP interface 900 includes a protocol bridge 906, an ingress buffer 908 and an egress buffer 910. In one embodiment, the ingress and egress buffers are integrated in protocol bridge 906. FIG. 9 also shows an optional set of ingress and egress buffers 912 and 914 on the tile side of D2D interconnect structure 904. In some embodiments, an ingress and egress buffer may reside in an existing IP/Accelerator tile interface (e.g., PCIe, CXL, etc.). In other embodiments, there are ingress and egress buffers on only one side of D2D interconnect structure 904, such as in the IP interface or protocol bridge.

Die-to-die interconnect structures are known in the art, and, generally, any type of die-to-die interconnect structure may be employed that meets the bandwidth requirements of the implementation. Die-to-die interconnect structures will usually employ various numbers of physical "wires" via which associated signals are transmitted, some of which are used for data, some for control, and other optional signals or fixed voltages, wherein the particular combination will be a function of the protocol used.

Generally, the dies referred to and illustrated herein may also be referred to chiplets. Recently, the Universal Chiplet Interconnect Express (UCIe) has been announced. UCIe is an open standard for chiplet interconnects (which also covers die-to-die interconnects). UCIe will enable chiplets, dies, tiles, etc., from the same or different vendors to be interconnected. The first version of the UCIe specification (UCIe 1.0) defines interconnect structures that borrow aspects from earlier standards, including PCIe, CXL, and Advance Interface Bus (AIB) technology. The UCIe 1.0 specification covers the physical layer (PHY) (electrical signaling, number of physical lanes, etc.) and the protocol layer defining the higher-level protocols overlaid over the physical signals. In some embodiments, the IP interface/protocol bridge/D2D interconnect structure employs the UCIe 1.0 PHY and protocol layer.

Figure 10:
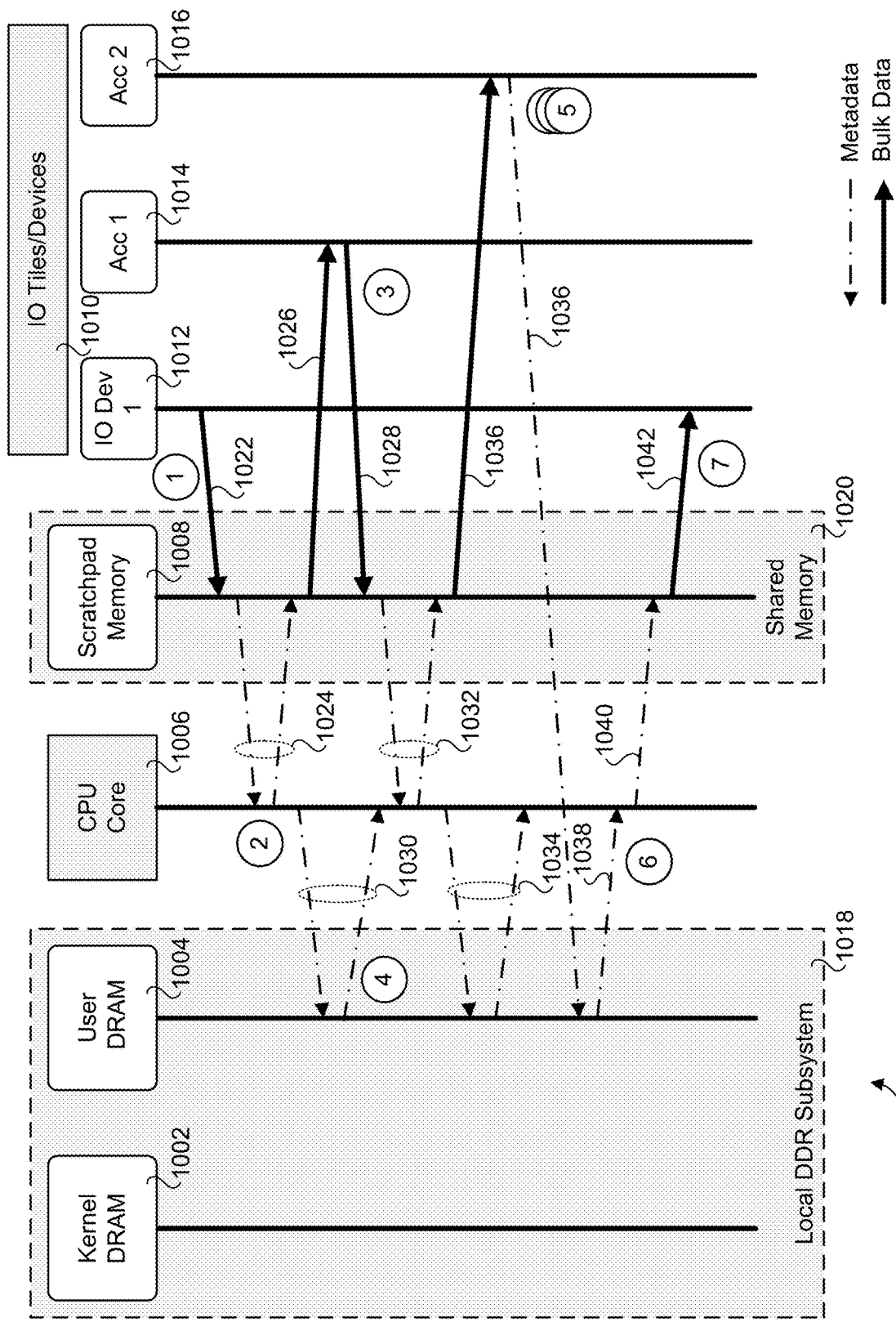
FIG. 10 is a message flow diagram illustrating message flows used for performing media analytics for a received media stream.

FIG. 10 shows a message flow diagram corresponding to media analytics process on a platform such as illustrated in FIGS. 2*a*, 2*b*, and 2*c* above, according to one embodiment. The platform components include kernel DRAM 1002, user DRAM 1004, a CPU core 1006, scratchpad memory 1008, and multiple IO tiles and/or devices including an IO device 1012 ("IO Dev 1"), and first and second accelerators 1014 and 1016 (also shown as 'Acc 1' and "Acc 2". Kernel DRAM 1002 and user DRAM 1004 are part of a local DDR subsystem 1018, while scratchpad memory 1008 is shared memory 1020 that is on an IP interface tile such as described and shown above.

Figure 11:
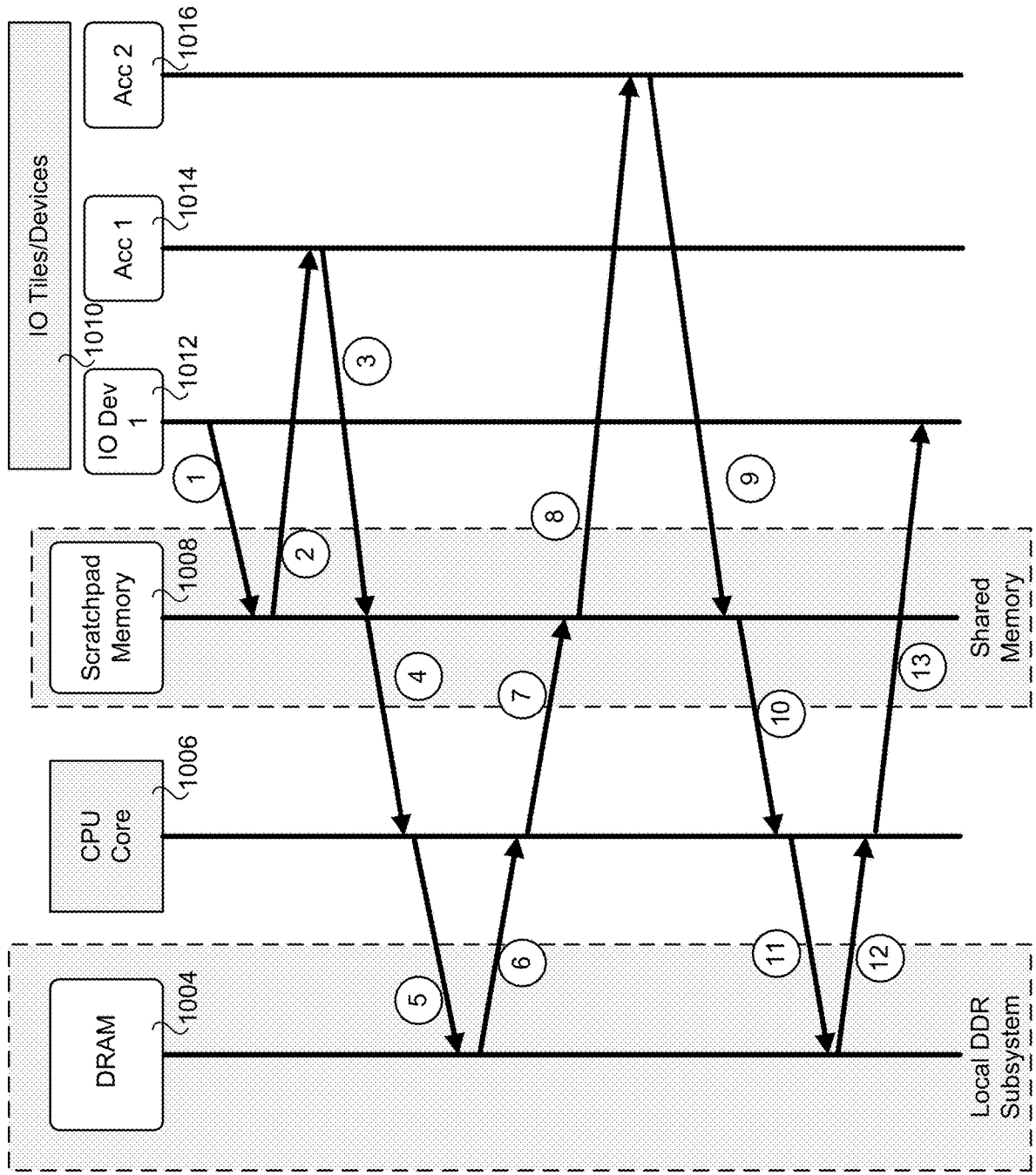
FIG. 11 is a message flow diagram illustrating message flows used for performing received signal processing at a Radio Access Network (RAN)
Figure 12:
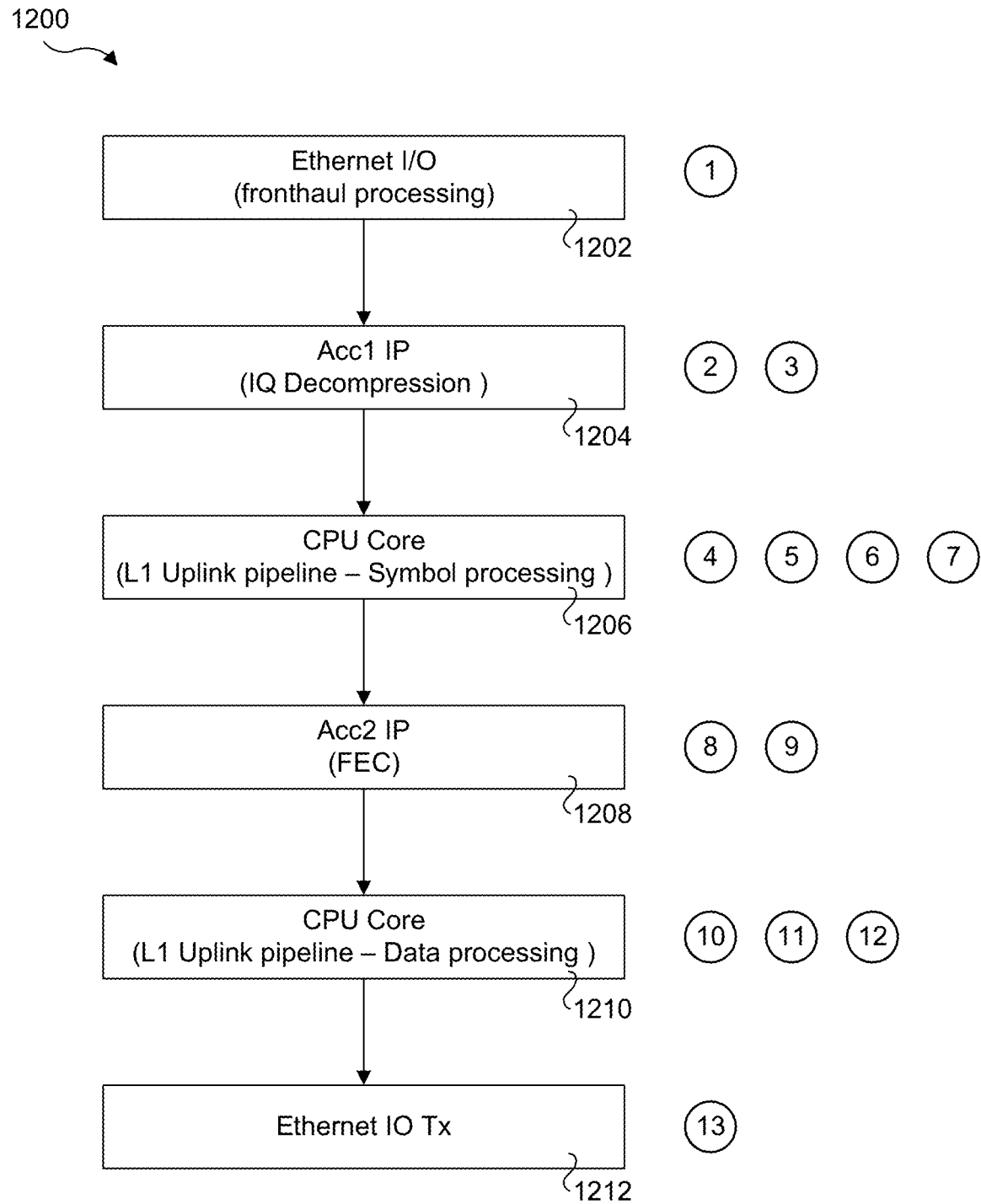
FIG. 12 is a flowchart illustrating operations performed in conjunction with the message flows in FIG. 11.

The process begins with an incoming flow that is received IO device 1012 and written to scratchpad memory 1008, as depicted by a first operation '1' and a message 1002. For instances, IO device 1012 might be a network interface controller (NIC) tile or devices that is coupled to a network, and the platform by deployed at a cell site, on premises, or an edge data center as illustrated in FIGS. 11 and 12 described below. In this case, the NIC would receive a flow of packets from the network and write the packet data (headers and payload) to scratchpad memory 1008. The packets would be part of a media flow, such as a streaming video, for example Next, as depicted by a second operation '2' and messages 1024, application code running on CPU core 1006 determines workflow based on metadata sent from IO device 1012 associated with the received packet flow and its media data. Notably, this operation does not involve reading or copying raw media data contained in the media flow packets. The application code running on CPU core 1006 returns metadata used for instructing a media accelerator how to process the media data that is written to scratchpad memory 1008.

As depicted by a third operation '3' and a message 1026, first accelerator 1014 reads the media data from scratchpad memory 1008 and processes it to perform a first portion of the media analytics operations for the media data. Results from the media analytics operations performed by first accelerator 1014 are then written back to scratchpad memory 1008, as depicted by a message 1028.

In parallel with these media analytics operations, CPU workload with acceleration operates on independent DRAM resources, as depicted by a fourth operation '4' and messages 1030, 1032, and 1034. These messages contain metadata that is used to offload a second portion of media analytics using an artificial intelligence (AI) accelerator depicted by second accelerator 1016. Messages 1030 represent metadata that is generated by the application code running on CPU core 1006 and written to user DRAM 1004. In connection with messages 1032, the application code reads metadata relating to completion of the media analytics operations performed by first accelerator 1014 from scratchpad memory 1008 and writes back metadata that will be used for the second portion of media analytics performed by second accelerator 1016. Messages 1034 represent metadata that is generated by the application code running on CPU core 1006 and written to user DRAM 1004.

As depicted by fifth operations '5' and a message 1036, second accelerator 1016 reads video data from scratchpad memory 1008 and processes it using an AI accelerator to perform the second portion of media analytics operations. As depicted by multiple instances of the fifth operation, this potentially may employ multiple passes by the AI accelerator. In connection with the AI accelerator processing, metadata is written by second accelerator 1016 to user DRAM 1004, as depicted by a message 1038. For example, these metadata might contain the analytic results data generated by the AI accelerator.

As depicted by a sixth operation '6' and messages 1038 and 1040, the application code reads the analytic results data from DRAM 1004, formats these data and writes them as formatted analytic results to scratchpad memory 1008. At this point, IO device 1012 (the NIC) reads the formatted analytic results, packetizes these data and sends the packets outbound to a network destination, as depicted by a seventh operation '7' and a message 1042.

Under the forgoing workflow, the shared memory (scratchpad memory 1008) adds net system bandwidth. The bulk media data is never moved to local DDR subsystem 1018, which reduces the net memory bandwidth required, and the streamed data does not thrash the CPU cache hierarchy. The lower utilization of local DDR subsystem 1018 also increases CPU performance.

FIG. 11 shows a message flow diagram 1100 corresponding to RAN pipeline process implemented on a platform such as illustrated in FIGS. 2a, 2b, and 2c above, according to one embodiment. A flowchart 1200 illustrating the RAN pipeline operations is shown in FIG. 12. The components implementing the flow have the same labels as in FIG. 10; however, in message flow diagram 1100 first accelerator 1014 is an accelerator IP that performs IQ decompression and second accelerator 1016 is an accelerator that performs Forward Error Correction (FEC).

As shown in a block 1201 and a first operation '1', the flow begins with the Ethernet I/O tile performing fronthaul processing. This will include receiving a packet flow and writing the packet data to a buffer scratchpad memory 1008. In a block 1204 the first accelerator 1014 performs IQ decompression, which is depicted by second and third operations '2' and '3'. During the second operation, first accelerator 1014 will read the packet data from the buffer in scratchpad memory 1008, perform the IQ decompression, and the write the decompressed data back to another buffer in scratchpad memory 1008.

Next, in a block 1206 CPU core processing is performed, comprising Layer 1 (L1) uplink pipeline symbol processing. The decompressed data comprise symbols used by the wireless protocol implemented by the RAN. The phase of the flow is depicted by operations '4', '5', '6', and '7', which entails the following. During operations '4' and '5' CPU core 1006 reads the decompressed data from the buffer in scratchpad memory and writes it to DRAM 1004. The processed symbol data are then written to a buffer in scratchpad memory 1008. In this example, CPU core 1006 will read the data from DRAM 1004 and write it to scratchpad memory 1008.

In a block 1208, the second accelerator 1016 performs forward error correction. As depicted by operations '8' and '9' this entails reading the processed symbol data from the buffer in scratchpad memory 1108 and performing the FEC operation on the second accelerator and the writing back the FEC processed symbol data to another buffer in scratchpad memory 1008.

In a block 1210 L1 uplink pipeline—data processing is performed. As depicted by operations '10', '11', and '12', this entails CPU core 1006 reading the FEC processed symbol data from the buffer in scratchpad memory 1008, using the CPU core to performing L1 uplink pipeline—data processing on these data and writing the processed data to DRAM 1004. During operations '12' and '13' CPU core 1006 will read the processed data from DRAM 1004 and forward it to the Ethernet IO device (1012), which can then send the processed data outbound for further processing as depicted by the Ethernet I/O transmit (Tx) operation in block 1212.

As illustrated by the message and data flows in FIG. 11, portion of the overall radio signal processing is performed in-line by the accelerator complex independent of the CPU cores, enable these tasks to be offloaded. This is just one example of in-line accelerator processing enabled by embodiments of the accelerator complex.

Figure 13:
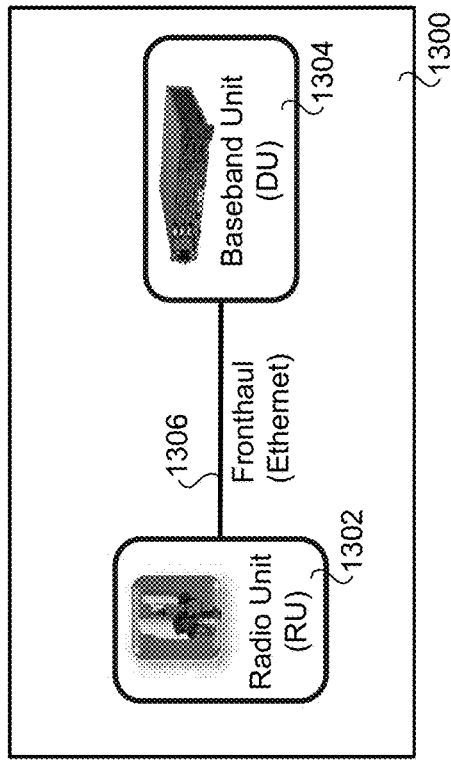
FIG. 13 is a diagram illustrating an example of a cell site and on-premises edge deployment.
Figure 14:
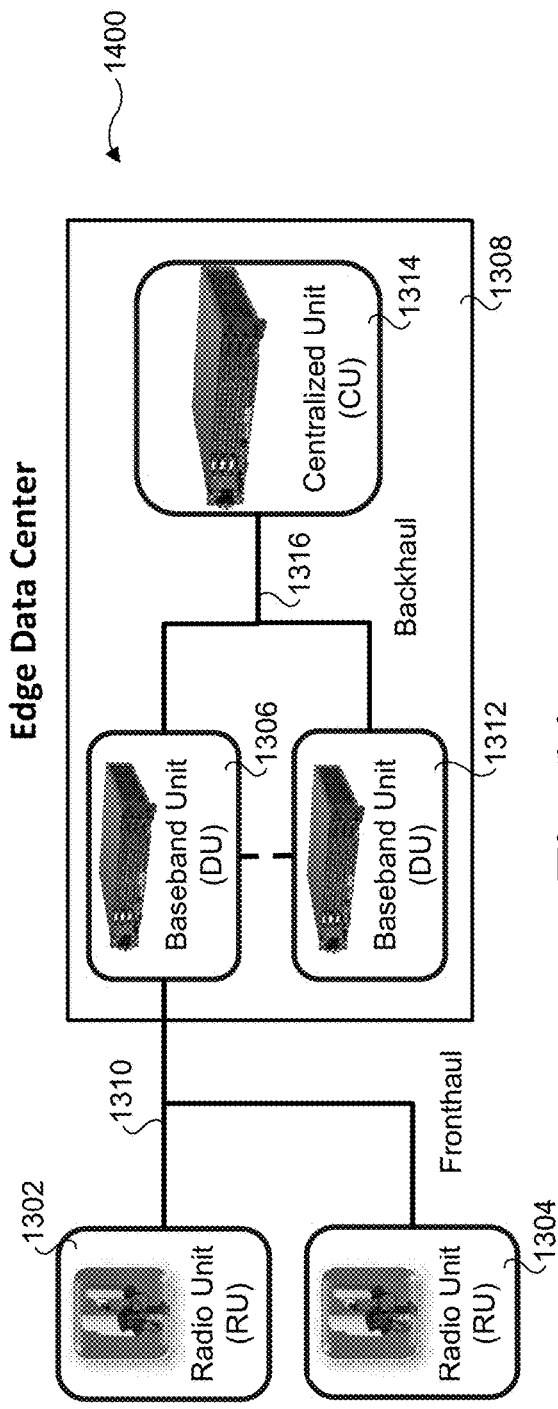
FIG. 14 is a diagram illustrating an edge data center deployment.

FIGS. 13 and 14 illustrate some exemplary use cases. As shown in FIG. 13, embodiments of the platforms described and illustrated above may be implemented in a cell site or on-premises edge deployment 1300 which includes a radio unit 1302 coupled to a baseband unit 1304 via a fronthaul network 1306. A platform 200, 200a, or 200b such as shown in FIGS. 2, 2a, and 2b or platform 400 shown in FIG. 4 may be implemented in baseband unit 1304 or in a separate platform (not shown) attached to baseband unit 1304. When deployed in a cell site or on-premises edge baseband unit 1304 may be implemented in a street cabinet at the base of a cell tower, in one embodiment.

FIG. 14 shows an edge data center deployment example. An edge data center may also be referred to as a micro data center and may be deployed at various locations. Under system 1400, radio units 1302 and 1304 are connected to a baseband unit 1306 in an edge data center 1308 via a fronthaul network 1310. Edge data center 1308 further includes a second baseband unit 1312, a centralized unit 1314, and a backhaul network 1316 coupled baseband units 1306 and 1312 to centralized unit 1314. Data received from radio units 1302 and 1304 may be processed by baseband unit 1306 or baseband unit 1312. Further processing is performed by centralized unit 1314, as depicted by a baseband unit 1312. Under architecture 1400, a platform 200, 200a, or 200b or platform 400 may be implemented in either one or more of baseband units 1306 and 1312 unit or centralized unit 1314.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Some operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, FPGAs etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A package, comprising:
    a central processing unit (CPU) having a plurality of cores and a plurality of caches and a first interconnect structure;
    an accelerator complex, coupled to the CPU via a first die-to-die, chiplet-to-chiplet, or chip-to-chip interconnect, comprising at least one die and including,
    a second interconnect structure;
    a plurality of intellectual property (IP) blocks;
    a plurality of input-output (IO) interfaces coupling the plurality of IP blocks to the second interconnect structure; and
    a shared memory coupled to the second interconnect structure, wherein the shared memory is shared among the plurality of IP blocks and the plurality of cores.

2. The package of claim 1, wherein the accelerator complex comprises:
    an IP interface tile comprising a first die including circuitry for the shared memory;
    a plurality of IP block dies; and
    a respective die-to-die interconnect coupling respective IP block dies to the IP interface tile.

3. The package of claim 2, wherein the CPU comprises a second die coupled to the IP interface tile via a die-to-die interconnect, and wherein the package comprises a multi-die package.

4. The package of claim 1, wherein the CPU comprises a first integrated circuit (IC) chip and the accelerator complex comprises a second IC chip, the CPU is coupled to the accelerator complex via a chip-to-chip interconnect, and the package comprises a multi-chip package or multi-chip module.

5. The package of claim 1, wherein the plurality of IP blocks includes one or more hardware accelerators, and wherein the accelerator complex includes an interface controller configured to schedule utilization of the one or more hardware accelerators.

6. The package of claim 1, wherein the accelerator complex includes an interface controller that is configured to set up data movement actions for chaining of tasks across two or more IP blocks.

7. The package of claim 1, having circuitry and logic to transfer data between a CPU core and an IP block by:
    performing a first data transfer under which data are written by the CPU core to a buffer in the shared memory; and
    performing a second data transfer under which the data that are written to the buffer in the shared memory are read by the IP block.

8. The package of claim 1, having circuitry and logic to transfer data between a first IP block and a second IP block by:
    performing a first data transfer under which data are written by the first IP block to a buffer in the shared memory; and
    performing a second data transfer under which the data that are written to the buffer in the shared memory are read by the second IP block.

9. The package of claim 1, having circuitry and logic to transfer data between a first IP block and a second IP block by:
    performing a first data transfer under which data are written by the first IP block to a buffer in the shared memory; and
    performing a second data transfer under which the data that are written to the buffer in the shared memory are written to a memory buffer in the second IP block.

10. The package of claim 1, wherein the accelerator complex further comprises a data mover comprising an IP block that provides software including host applications to be executed by the CPU with an interface for effecting data movement between the plurality of IP blocks and host application domains.

11. A system comprising:
    memory;
    a multi-die package, including:
    a first die or chiplet comprising a central processing unit (CPU) die having a plurality of cores, a plurality of caches and a first interconnect structure to which a memory controller is coupled, the memory controller coupled to the memory via one or more memory channels;
    a second die or chiplet comprising an Intellectual Property (IP) interface tile coupled to the CPU die via a die-to-die interconnect or a chiplet-to-chiplet interconnect, including,
    a second interconnect structure;
    a shared memory coupled to the second interconnect structure; and
    a plurality of IP interfaces coupled to the second interconnect structure; and
    a plurality of intellectual property (IP) blocks coupled to the second interconnect structure via a respective IP interface,
    a plurality of input output (IO) interfaces coupling the plurality of IP blocks to the second interconnect structure, wherein the shared memory is shared among the plurality of IP blocks and the plurality of cores.

12. The system of claim 11, wherein the plurality of IP blocks include one or more IP blocks that are integrated on separate dies that are coupled to the IP interface tile via respective die-to-die interconnects or chiplet-to-chiplet interconnects.

13. The system of claim 11, wherein the plurality of IP blocks includes one or more hardware accelerators, and wherein the IP interface tile includes an interface controller configured to schedule utilization of the one or more hardware accelerators.

14. The system of claim 13, wherein the interface controller is further configured to set up data movement actions for chaining of tasks across two or more IP blocks.

15. The system of claim 11, wherein the IP interface tile includes a data mover coupled to the second interconnect structure comprising an IP block that provides software including host applications to be executed by the CPU with an interface for effecting data movement between the plurality of IP blocks and host application domains.

16. A method performed in a system including a multi-die package having a first die including a central processing unit (CPU) and a second die coupled to the first die comprising an Intellectual Property (IP) interface tile having an integrated memory and a plurality of IP interfaces coupled to a network interface and a plurality of accelerators, the method comprising:

receiving data at the network interface and writing the data to the integrated memory; and employing a pipeline chain of accelerator operations with at least two of the plurality of accelerators, the pipeline chain of accelerator operations including, a first accelerator reading data from a buffer in the integrated memory, processing the data, and writing first processed data back to the integrated memory; and a second accelerator reading the first processed data from the integrated memory, processing the first processed data to produce second processed data, and writing the second processed data back to the integrated memory.

17. The method of claim 16, wherein the system in is implemented in a Radio Access Network (RAN), and the method is used to process data received at a RAN facility.

18. The method of claim 17, wherein at least one of the first and second accelerators comprise an artificial intelligence (AI) accelerators.

19. The method of claim 16, wherein the IP interface tile includes an interface controller, further comprising setting up the pipeline chain of accelerator operations using the interface controller.

20. The method of claim 16, wherein at least two of the plurality of accelerator are implemented on separate dies that are coupled to respective IP interfaces in the IP interface tile via die-to-die interconnects or chiplet to chiplet interconnects.

\* \* \* \* \*